United States Patent
Mukherjee et al.

(10) Patent No.: US 10,984,139 B2
(45) Date of Patent: Apr. 20, 2021

(54) TAMPER-RESISTANT DATA ENCODING FOR MOBILE DEVICES

(71) Applicant: Visa International Service Association, San Francisco, CA (US)

(72) Inventors: Pratyay Mukherjee, Santa Clara, CA (US); Kristina Hostak, Darmstadt (DE)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 17/046,736

(22) PCT Filed: Apr. 10, 2018

(86) PCT No.: PCT/US2018/026904
§ 371 (c)(1),
(2) Date: Oct. 9, 2020

(87) PCT Pub. No.: WO2019/199283
PCT Pub. Date: Oct. 17, 2019

(65) Prior Publication Data
US 2021/0049308 A1    Feb. 18, 2021

(51) Int. Cl.
*G06F 21/00* (2013.01)
*H04L 29/06* (2006.01)
(Continued)

(52) U.S. Cl.
CPC ............ *G06F 21/78* (2013.01); *H04L 9/0643* (2013.01); *H04L 9/085* (2013.01); *H04L 9/0897* (2013.01); *H04L 9/30* (2013.01); *H04L 9/3218* (2013.01)

(58) Field of Classification Search
CPC ......... G06F 21/78; H04L 9/0643; H04L 9/30; H04L 9/0897; H04L 9/3218; H04L 9/085
See application file for complete search history.

(56) References Cited

U.S. PATENT DOCUMENTS 9,167,207 B1 * 10/2015 Drewry .................... H04L 9/08
2005/0114683 A1    5/2005 Jin et al.
(Continued)

FOREIGN PATENT DOCUMENTS

EP          2290872        3/2011
WO       2016193139       12/2016

OTHER PUBLICATIONS

Application No. PCT/US2018/026904, International Search Report and Written Opinion, dated Jan. 9, 2019, 13 pages.
(Continued)

*Primary Examiner* — Lisa C Lewis
(74) *Attorney, Agent, or Firm* — Kilpatrick Townsend & Stockton LLP

(57) ABSTRACT

Systems, methods, and apparatuses can protecting a secret on a device with limited memory, while still providing tamper resistance. To achieve the lower memory usage, embodiments can apply a memory-hard function MHF to the secret S to obtain a result Y, which can be used in an encoding process to obtain a code C. After applying the MHF, a prove function can generate a proof value that is used in a decoding (e.g., a verification of computation process) of the code C. The code C can include the proof value, the secret S, and the result Y, and can be sent to a decoding device that verifies the code C as part of a decoding process.

20 Claims, 15 Drawing Sheets

(51) Int. Cl.
      *G06F 21/78*     (2013.01)
      *H04L 9/06*      (2006.01)
      *H04L 9/08*      (2006.01)
      *H04L 9/32*      (2006.01)
      *H04L 9/30*      (2006.01)

(56) References Cited

U.S. PATENT DOCUMENTS

| | | |
|---|---|---|
| 2012/0072225 A1 | 3/2012 | Richardson et al. |
| 2012/0324231 A1* | 12/2012 | Camenisch ............. H04L 9/302 713/176 |
| 2015/0327072 A1 | 11/2015 | Powell et al. |
| 2018/0198632 A1* | 7/2018 | Gajek ....................... H04L 9/30 |

OTHER PUBLICATIONS

Application No. EP18914313.4, Extended European Search Report, dated Feb. 3, 2021, 10 pages.
Faust et al., "Non-Malleable Codes for Space-Bounded Tampering", International Association for Cryptologic Research, XP061023577, Jun. 6, 2017, pp. 95-126.

* cited by examiner

900

910 • Let F = MHF∘H

920 • VC.SETUP(F) → pp.

930 • PROVE$_{pp}$(x) → (C): Execute the following steps:
931 • Hash: z:=H(x)
932 • Apply MHF: y = MHF(z)
933 • VC.PROVE$_{pp}$(x,y) → π
934 • Return C = (x, y, π, pp)

940 • VERIFY$_{pp}$(C) → Parse x,y π, pp := C and then return VC.VERIFY$_{pp}$(y,x,π)

FIG. 9

Let F be a memory hard function and (KeyGen, Compute, Verify) a SPVC scheme. Then we define a coding scheme (Setup, Encode, Decode) as:

1110 Setup($\lambda$):
 1. Generate $(EK_F, VK_F) \leftarrow$ KeyGen$(F, \lambda)$ 1120 Encode($x$):
 1. $(y, \pi_y) :=$ Compute$(EK_F, x)$
 2. Output $c := (x, y, \pi)$ 1130 Decode($c$):
 1. Parse $(x, y, \pi) := c$
 2. If Verify$(VK_F, x, y, \pi) = 1$, then output $x$; else output $\bot$.

FIG. 11

TAMPER-RESISTANT DATA ENCODING FOR MOBILE DEVICES

This application is a 371 patent application of International Application No. PCT/US2018/026904, filed on Apr. 10, 2018, titled "TAMPER-RESISTANT DATA ENCODING FOR MOBILE DEVICES", which is herein incorporated by reference in its entirety for all purposes.

BACKGROUND

When secret data (such as secret key for encryption) is stored in "secure" memory of the devices, attackers can still tamper with the "secure" memory using fault attacks. In fault attacks, values in a memory cell are altered, and an output of a secure function (e.g., in a secure element including the secure memory) can be used to deduce the original secret data. Once the secret data is known to the attacker, she can use that to break the security of the relevant system, for example, by decrypting the ciphertexts encrypted with secret key(s), which are part of the recovered secret data. As other examples, an attacker could use the secret data in some authentication protocol to gain improper access to a resource. Such an attack might occur when a phone is stolen or malware has been introduced.

The overall effectiveness of fault attacks as a method of hardware tampering and memory leakage makes them a widely-used technique for accessing private data stored on consumer devices. For example, fault attacks can be effective against RSA or elliptic curve Diffie-Helman techniques, as may be used in transport layer security (TLS). As such, a growing number of researchers are attempting to find coding schemes that protect data against the vulnerabilities of memory to fault attacks and similar forms of hardware tampering.

Such attacks can be partially addressed by using non-malleable codes, such that the secret data is stored by encoding with a non-malleable code. Such encoding does not need a key, and is thus different from encryption. Use of a non-malleable code can allow the secure element to detect whether tampering has been done, or result in a same output. However, non-malleable codes require a decoding function to be used in the secure element. It is possible that attacker malware can include or gain access to the decoding function, as well as include an encoding function. Such malware can recover the secret data using tampering. Existing protection techniques do not address such malware, and thus leave open vulnerabilities.

Embodiments described herein address these and other problems, individually and collectively.

BRIEF SUMMARY

Embodiments of the invention included systems, methods, and apparatuses for protecting a secret on a device with limited memory, while still providing tamper resistance. To achieve the lower memory usage, embodiments can apply a memory-hard function MHF to the secret S to obtain a result Y, which may be used as part of the encoding process to obtain a code C. The encoding can be done by a provisioning computer. After applying the MHF, a prove function can generate a proof value that is used in a decoding (e.g., a verification of computation process) of the code C. The code C can include the proof value, the secret S, and the result Y, and can be sent to a decoding device that verifies the code C as part of a decoding process, e.g., when the secret S is needed in a cryptographic function. The separation of the MHF from the prove function can allow the decoding to use less memory, while still ensuring that the encoding process requires a sufficient amount of memory.

According to one embodiment, a method encodes a secret on an encoding computer. One or more public parameters can be retrieved, where the one or more public parameters can be generated based on a memory-hard function MHF and a security parameter $\lambda$. The memory-hard function MHF can be applied to a secret S or to a function (e.g., a hash) of the secret S to obtain a result Y. The applying of the memory-hard function MHF to the secret S can require at least N bytes of memory on the encoding computer, N being at least one gigabyte. A prove function can determine a proof value $\pi$ using the secret S, the result Y, and the one or more public parameters. A codeword C can be assembled from the proof value $\pi$, the secret S, and the result Y. The codeword C can be sent to a device that is configured to store and later decode the codeword C. The proof value $\pi$ can be configured to be used by a decoding function of the device to verify a correctness of the result Y as being obtained from the memory-hard function MHF using the secret S. The decoding function can be operable to use K bytes of memory, with K being less than N, e.g., 100 times less.

These and other embodiments of the invention are described in detail below. For example, other embodiments are directed to systems, devices, and computer readable media associated with methods described herein.

Further details regarding embodiments of the invention can be found in the Detailed Description and the Figures described herein.

BRIEF DESCRIPTION OF THE DRAWINGS

FIG. 9 shows an example encoding/decoding scheme using a hash function according to embodiments of the present invention.

FIG. 11 show a depiction of the encoding/decoding scheme from FIG. 10.

TERMS

Figure 1:
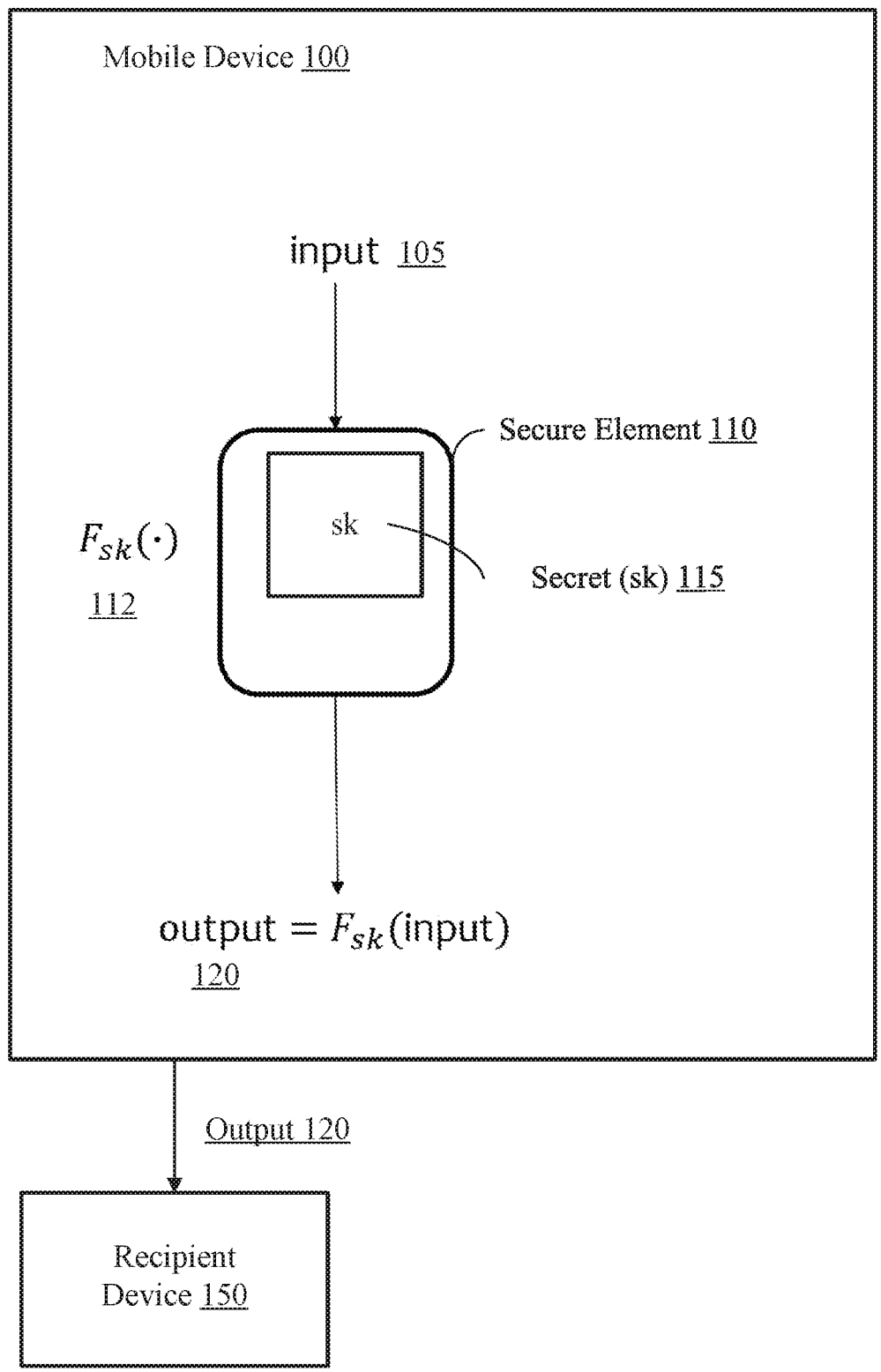
FIG. 1 shows a mobile device storing a secret sk in a secure element.

"Non-malleable code(s)" may refer to a coding scheme for which decoding a codeword that has been altered (e.g. by a tampering adversary) results in either the original (unaltered) message or a completely unrelated value from which no knowledge can be inferred.

"Space-bounded," "memory-bounded," or "memory-hard function" (MHF) may describe a function or task where the time needed to complete the task is mainly determined by the amount of usable memory required. For example, for a space-bounded computational problem, the efficiency of the particular computational process may be most affected by the rate at which data can be read and stored into memory (i.e. memory bandwidth) rather than by the clock speed of the processor. A memory hard function requires a certain number of storage bits to be performed. Strict memory hard hashing functions are an example of a memory-hard function. A memory-hard function needs time T and space S for ordinary computation, but the amount of time increases greatly if the amount of available space is less than S.

"Verifiable computation" may refer to a procedure to efficiently check correctness of a computation without performing the computation itself. A goal can be to develop a verification procedure that is much more resource (space/time)-efficient than the target computation itself. For example, one may consider a memory-intensive computation on a huge database over a cloud-server. A client wants the server to perform some computation (e.g. aggregation) on the database and can use verifiable computation to check whether the result is correct without performing the actual operation on the data.

A "prove function" may refer to a function that produces a "proof value" that can be used to verify a computation. The proof value may be succinct in that it can be computed with relatively low memory (space), thereby allowing the decoding to be produced in low space. The use of a MHF during encoding can ensure that high memory is required, even when the prove function itself can be performed in low memory.

A "verification function" may refer to a procedure for using a proof value to confirm that a code C is generated from a secret S by a specified encoding function.

A "security parameter" may refer to a fundamental system parameter that is specified according to the desired security level. All other metrics (for example, running time, memory required etc.) of a scheme may be measured in terms of the security parameter.

A "randomized algorithm" may refer to a computation that uses random bits extracted from a trusted source of randomness. The output of such an algorithm, on a particular input, can follow a probability distribution.

A "deterministic algorithm" may refer to a computation that does not use any randomness, and the output of such algorithm, on a particular input, is fixed as it is determined only by the input.

A "secure element" is a tamper-resistant platform (e.g., a one chip secure microcontroller) capable of securely hosting applications and their confidential and cryptographic data (e.g. key management) in accordance with the rules and security requirements set forth by a set of well-identified trusted authorities. Example form factors include Universal Integrated Circuit Card (UICC), embedded SE and microSD.

DETAILED DESCRIPTION

Embodiments describe using memory-hard functions and verifiable computation to achieve non-malleable codes, e.g., allowing error detection or always providing the same input data when a non-malleable code is detected. Further, the decoding can be practically implemented with today's mobile devices while the encoding cannot, thereby preventing the mobile device from generating a code that can be used to improperly authenticate a device.

To accomplish such non-malleable codes, a server may encode a message (m), e.g., a secret key (sk), to generate a code (y) (also referred to as 'c') and generate a proof value $\pi$ that corresponds to a particular m/y pair (also referred to as a sk/c or m/c pair). The proof value $\pi$ may be constant in size regardless of message size. Both the code and the proof value are then sent to a mobile device. To decode the message, the mobile device may be required to verify the proof value. For example, a decoding function can require the verification to occur first before the decoding functionality can be accessed. As another example, the verification can provide the decoding, e.g., when the code includes the message. Thus, a correct evaluation of the proof value can initiate a decode operation, thereby allowing the device to decode the code to obtain the message in cleartext. The message can then be used in a function, e.g., by an encryption function to encrypt input data, where the encrypted output can be sent to another device.

In embodiments, generating a proof value for a new input data may take considerably more memory than verifying a proof value for an existing message(m)/code(y) pair. Therefore, given the amount of limited availability of memory storage on a mobile device, if an attacker were to introduce a fault to the stored code or during a decode operation, the added fault could not be integrated into a re-encode operation for lack of memory resources. Thus, the re-encode operation would not leak any original information, and the attacker would be unable to deduce the encoding function, e.g., as a relationship between encoded inputs and the output code.

As part of requiring the encoding to use a high amount of memory, a memory-hard function (MHF) can operate on the secret S or some other function of S. For example, the MHF can operate on a hash of S. Such a procedure guarantees that for given a S, one cannot compute MHF(S) in low space (memory). Since the MHF provides the high memory requirement, the verifiable computation aspect can use less memory. For example, the generation of the proof and the verification can use a small amount of memory such that they can execute on a mobile device. The prove function that generates the proof together with the MI-IF can comprise the encoding function. The verification function can perform the decoding. Thus, the best a low space adversary can do is to overwrite with an encoding of pre-computed S' that is clearly unrelated with S.

I. Tampering with Secure Element

A mobile device may be provisioned with a secret sk for a variety of reasons. For example, the secret sk may be used as a secret key to encrypt communications. As another example, secret sk can be used for authentication purposes so that the mobile device can gain entry to a resource (e.g., a building, a computer, or an account). Depending on requirements, the mobile device can operate on input data (e.g., a challenge) using the secret sk to produce an authentication response when requested to an authentication computer.

A. Use of Secure Element to Encrypt

FIG. 1 shows a mobile device 100 storing a secret (sk) 115 in a secure element 110. Secure element 110 can store secret 115 in secure memory of secure element 110. Secure element 110 can also include circuitry to perform a function 112, identified as $F_{sk}(\bullet)$. Function 112 can operate on input 105 to provide output 120. Mobile device 100 can then send output 120 to a recipient device 150, which can decrypt output 120 to obtain input 105.

Such an operation may occur when input 105 is to be encrypted and sent as output 120, using secure 115 as an encryption key. Recipient device 150 could be previously provisioned with the same secret, potentially having initially provided the secret to mobile device 100. As another example, recipient device 150 can provide input 105 as a challenge to mobile device 100. Recipient device 150 can then compare output 120 to an expected result so as to authenticate mobile device 100.

B. Tampering to Determine Secret Key

Unfortunately, an attacker can compromise a secure element, e.g., using a tampering function as a fault attack. Thus, the attacker can be a tampering function that was installed onto the mobile device. The tampering function can further infiltrate the secure element so that secret data is manipulated, thereby resulting in output data that can reveal the contents of the secret data. Accordingly, in such situations, repeated outputs of the secure element after tampering can be analyzed to reveal the secret data.

Figure 2:
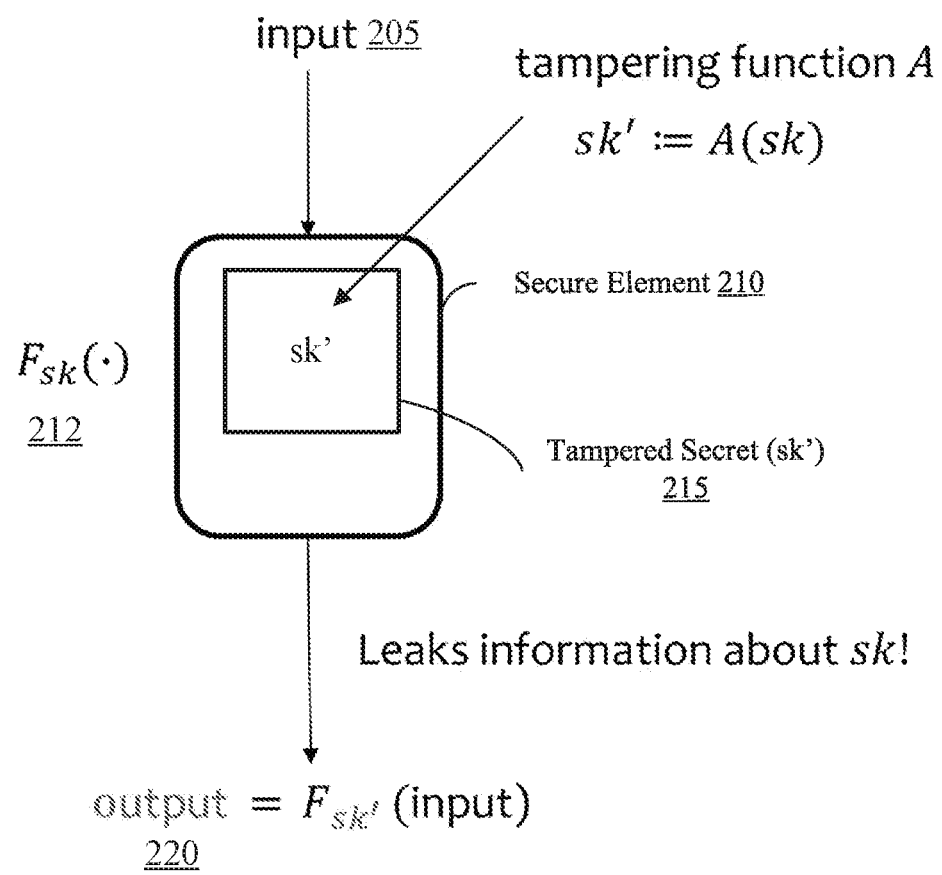
FIG. 2 shows a tampered secure element that may be inside a mobile device.

FIG. 2 shows a tampered secure element that may be inside a mobile device. Secure element 210 can perform a function 212 using a secret 215. As shown, secret 215 has been tampered, illustrated as sk' resulting from an original secret sk. The tampering function A can be defined by sk':=A(sk). As examples, the tampering function A can result from malware infecting secure element 210 or a physical tampering, as may be done with a laser on the physical memory.

For example, an attacker may introduce faults to memory (e.g., flash memory or dynamic random-access memory (DRAM)) by selectively altering charge states of its capacitors (e.g. using a laser), and thus performing "bit flips" that cause leakage of a targeted row of bits in a memory cell between read and write operations (i.e., Rowhammer attacks). These types of attacks are especially prevalent in smaller devices, which have memory units designed specifically for minimal power consumption, such as smartphones, tablets, and other mobile personal devices.

Output 220 is generated from input 205 using function 212 and the stored secret, which is a tampered secret 215 (shown as sk') in this example. Since output 220 depends on the value of the stored secret, modifying the stored secret will affect output 220. Accordingly, information about the original secret sk is leaked through output 220. The sufficient set of data points for different inputs and outputs after multiple rounds of tampering, an attacker could reconstruct the original secret sk from the inputs and outputs. It would be advantageous to prevent such attacks.

The attacker's goal is to recover the secret. If a mobile devices is stolen, someone can use it but someone cannot recover the secret key as it is stored in a secure element. However, once they have tampered with the device and then try to use it, they will get a different kind of response from the device.

Tampering can be performed by physical means, such as using a laser to alter the secret. Such tampering causes the memory to actually store different values and therefore operate in a slightly different manner. The slight change in response can be compared to the original response and used to make conclusions about the secret. If you cause some sort of change in the device when it sends out a cryptogram or sends out another type of data message, it can differ in such a way that one is able to probe what the secret is. For example, if the first bit of a secret is zero, it will respond differently than if the first bit of the secret is one.

In one particular context, a mobile device may store a mobile payment application, and may subsequently have a secret stored somewhere in the application. An attacker can then rely on non-physical tampering means, such as by introducing malware to the application, to tamper with the secret stored therein. For example, the malware may blindly alter values sent to a trusted execution environment or hardware module.

II. Non-Malleable Codes and their Application

Non-malleable codes can provide some level of protection from tampering attacks. For example, a secret message m can be encoded to provide a code c, which is stored. Even if the code is tampered, a decode function may still provide the secret message m. Or, the decode function can provide an error indicating that tampering was performed. If neither of these happens, then the decoded message can be one that is unrelated to the message originally encoded.

Figure 3A:
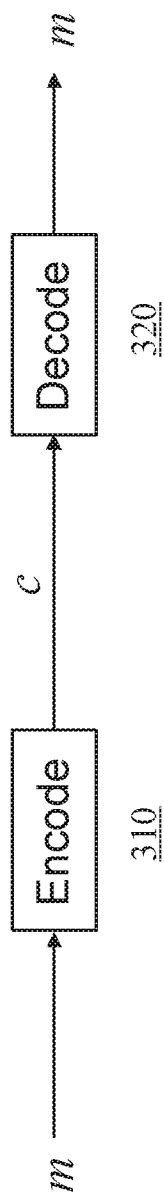
FIG. 3A shows the correctness property of non-malleable codes.

FIG. 3A shows the correctness property of non-malleable codes. A secret message m is encoded by encoding function 310 to obtain code c. A decoding function 320 decodes the code c to obtain the original secret message m when there is no tampering present.

Figure 3B:
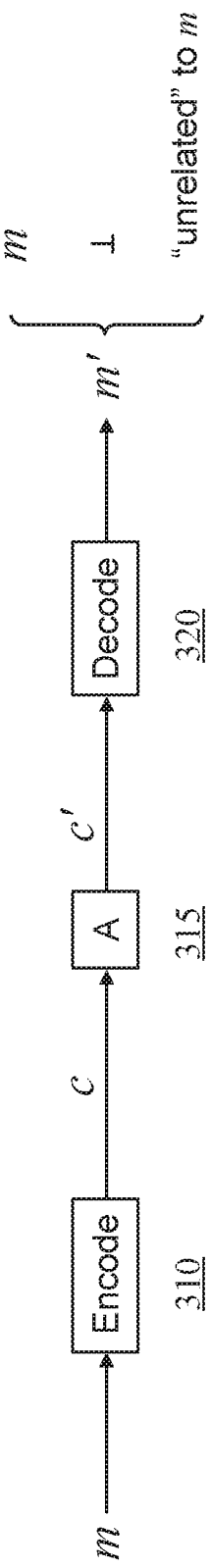
FIG. 3B shows the non-malleability property of non-malleable codes.

FIG. 3B shows the non-malleability property of non-malleable codes. Again, the secure message m is encoded by encoding function 310 to obtain code c. But this time, an attacker 315 changes the code c to be code c'. As a result, decoding function 320 decodes code c' to get m'. The decoding process may be such that both code c and code c' decode to m, and thus m' equals m. But, if m and m' differ, the decoding function 320. In theory, the decoding function 320 can also include a verification function that can detect when m does not equal m', i.e., a detection. The value 1 indicates an error. But, how to determine such a verification function is not clear, particularly if the decoding function 320 needs to be performed on a mobile device. The error detection does not need to be perfectly accurate, as long as m' is unrelated to m, and thus no information can be obtained from an output generated using m'.

Thus, for non-malleable codes, an encoded message will either completely change when altered or not change at all, or an error will be detected. An example for error-detection code using verification of computation is algebraic manipulation detection (AMD) code (www.iacr.org/archive/eurocrypt2008/49650468/49650468.pdf or tampering-detection code.

A. Protection of Secret Key

An implementation of non-malleable codes in the context of a secret stored on a mobile device (e.g., as in FIG. 1) is now described.

Figure 4:
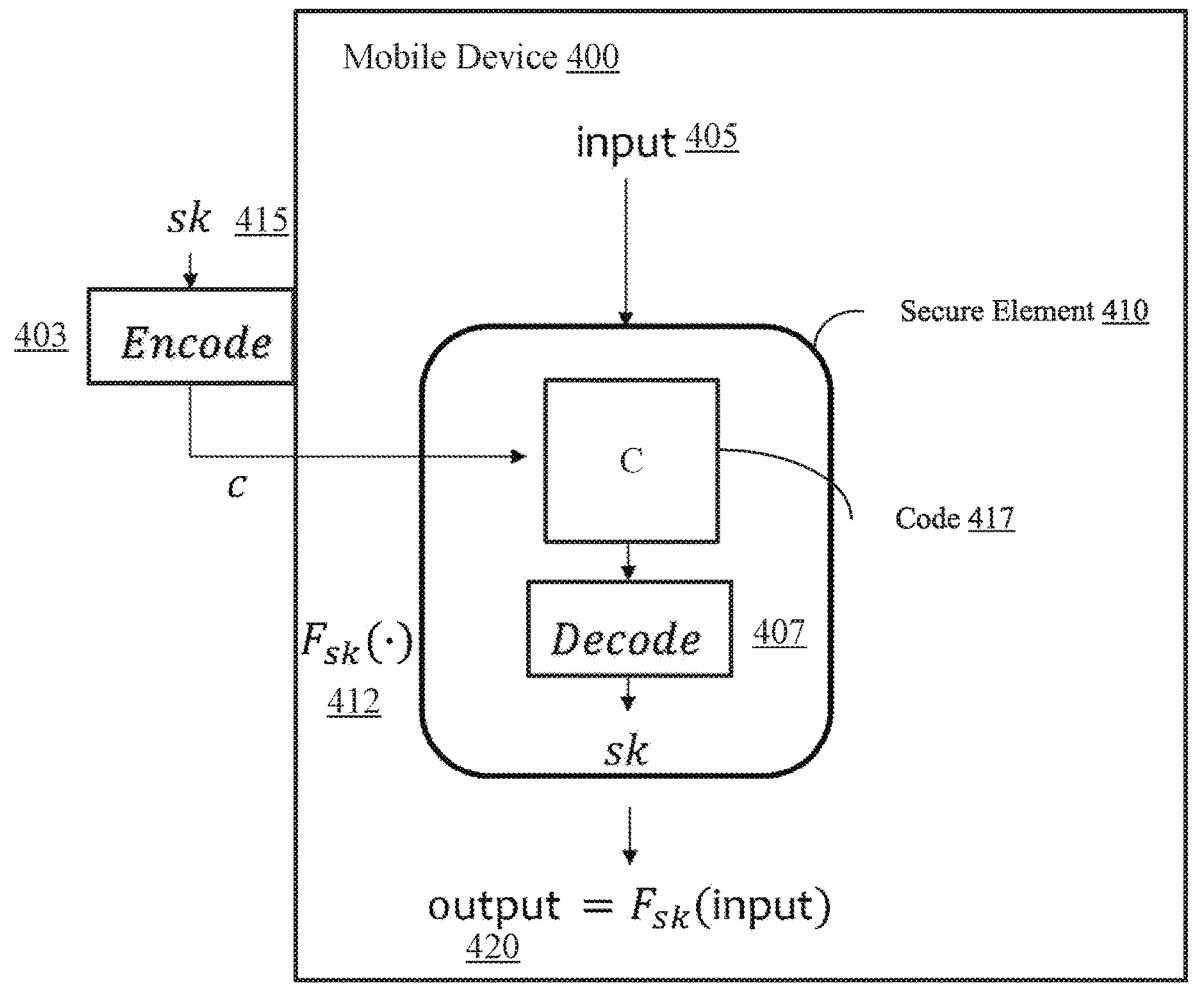
FIG. 4 show a use of non-malleable codes for protecting a secret stored in a secure element of a mobile device 400 according to embodiments of the present invention.

FIG. 4 show a use of non-malleable codes for protecting a secret stored in a secure element of a mobile device 400 according to embodiments of the present invention. A secret (sk) 415 can be encoded by encoding function 403 to obtain a code c. Encoding function 403 can be implemented by a provisioning device outside of mobile device 400. Examples of a provisioning device include a server that provisions over a network or a local device, e.g., via a direct wired or wireless connection (e.g., Bluetooth or WiFi). In various implementations, the provisioning can be performed by a manufacturer, a service provider (e.g., a cellular carrier), or a technician after a user has acquired the mobile device.

Code c can be provided to mobile device 400 and stored in secure element 410. Secure element 410 can include circuitry (e.g., hardwired or programmable circuitry) for performing a function 412 (e.g., encryption) and for performing a decoding function 407.

As part of executing an application (e.g., a authentication or encrypted communication), a processor (not shown) of mobile device 400 can provide input 405 to secure element 410 to obtain an output 420, e.g., for sending to an external device. To generate output 420, decoding function 47 retrieves code 417 from a secure memory and decodes code 417 to obtain the original secret 415. Function 412 uses secret 415 to operate on input 405 to obtain output 420.

B. Tampering Resilience

A tampering class encompasses tampering functions/algorithms that a device can tolerate without exposing the underlying data. Typically, the encoding/decoding functions cannot tolerate all classes of tampering algorithms. Embodiments are directed to handling situations of hard to tolerate tampering algorithms, e.g., when a device is compromised.

A popular tampering class is granular tampering. A secret can be encoded to get a code word that has two parts, c1, c2. The two parts can be stored on a same device or two physically separate devices. The attack would have to be on the two different parts of code words independently, with two different decoding functions that cannot see each other. The attacker knows there are two parts, but the tampering algorithms cannot contact each other because they are separated. The attacker may operate on one, but really needs both parts in order to expose information.

Another class is global tampering, which means that the attacker had access to the entire code word. Such tampering classes assume that the attacked cannot decode or encode. In such a case, the attacker can only change the code word a little bit and hope to decipher the original secret, which is very difficult. An example where the attacker cannot decode or encode is not provided.

Figure 5:
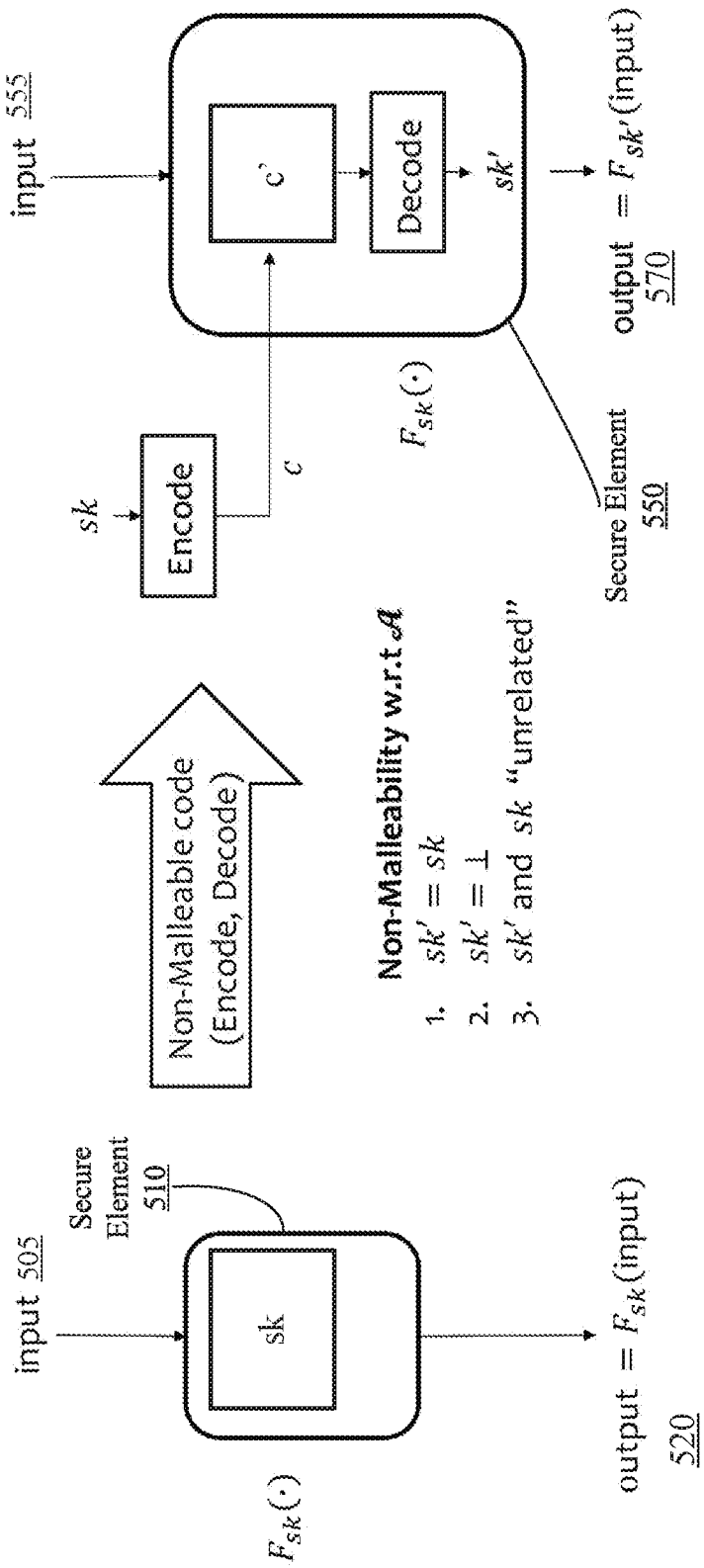
FIG. 5 illustrates a benefit of using non-malleable codes in the context of storing a secret in a secure element for performing a cryptographic function according to embodiments of the present invention.

FIG. 5 illustrates a benefit of using non-malleable codes in the context of storing a secret in a secure element for performing a cryptographic function according to embodiments of the present invention. FIG. 5 shows the example implementations from FIG. 2 and FIG. 4 side-by-side.

Secure element 510 stores a secret sk for performing a function $F_{sk}(\bullet)$ on input 505 to obtain output 520. Secure element 510 is susceptible to tampering attacks, as discussed above.

Secure element 550 stores a code c generated from secret sk using an encoding function. Secure element 550 decodes the code c to obtain the secret sk, which is then used for performing a function $F_{sk}(\bullet)$ on input 555 to obtain output 570.

As shown, the code c has been tampered to obtain c'. Thus, the decoding function is shown outputting sk'. Assuming the attacker can only modify the code c, the value for sk' should provide three possibilities for an output.

For possibility 1, sk'=sk, e.g., as the amount of change between c and c' is minimal, and thus the decoding function outputs the same value. For example, the decoding function can map more than one input to a same output. Such a procedure can be analogous to an "error-correction" mechanism, with one way to attain being adding redundancy into the codeword.

For possibility 2, the decoding function can detect that the decoded value does not correspond to code c', and thus tampering is detected. If tampering is detected, the decoding function can output a predetermined error character of 1. How to determine such an inconsistency between code c' and the decoded value is described later.

For possibility 3, the decoding function determines that c' and the decoded value are consistent with each other, but such a result should only be possible when sk and sk' are unrelated and thereby sk' does not reveal any meaningful information about sk. This may occur if the attacker overwrites the encoding of sk with an encoding of a known sk'; clearly in this case sk' is independent of sk as it is already known to the attacker. For a non-malleable code, if a single bit is altered when using an encoding algorithm, the response becomes completely unrelated to the original message, and thus introducing a fault could not be used to deduce the secret. Being "unrelated" covers both error-detection and correct decoding with an unrelated sk'. An attacker would be unable to isolate a change relating to a single bit-flip due to the non-malleable property of the code. In the case of malware introduced to an application, even if the malicious program were to override a secret stored in the application with its own secret, it would be unable to infer any information about the original secret.

Secure element 550 can still be susceptible to tampering attacks, e.g., if the attacker can perform encoding and decoding. The particular encoding and decoding techniques may be public, e.g., as part of a standard. Thus, it is feasible that an attacker could generate malware that performs these functions. Such an attack is addressed in the next section.

III. More Sophisticated Attacks

Unlike encryption, which uses additional secret information (e.g., keys), no such additional secret information is used for encoding/decoding. With these encoding or decoding procedure, there is no private key, mapping, or other authentication key. Further, the encoding/decoding functions are typically known to the public, e.g., as part of a standard. Thus, there is an encoded secret stored in a memory of a device, wherein anyone can decode, tamper, and then re-encode the secret on the device. There is no capability on the device as shown, to prevent these operations.

Figure 6:
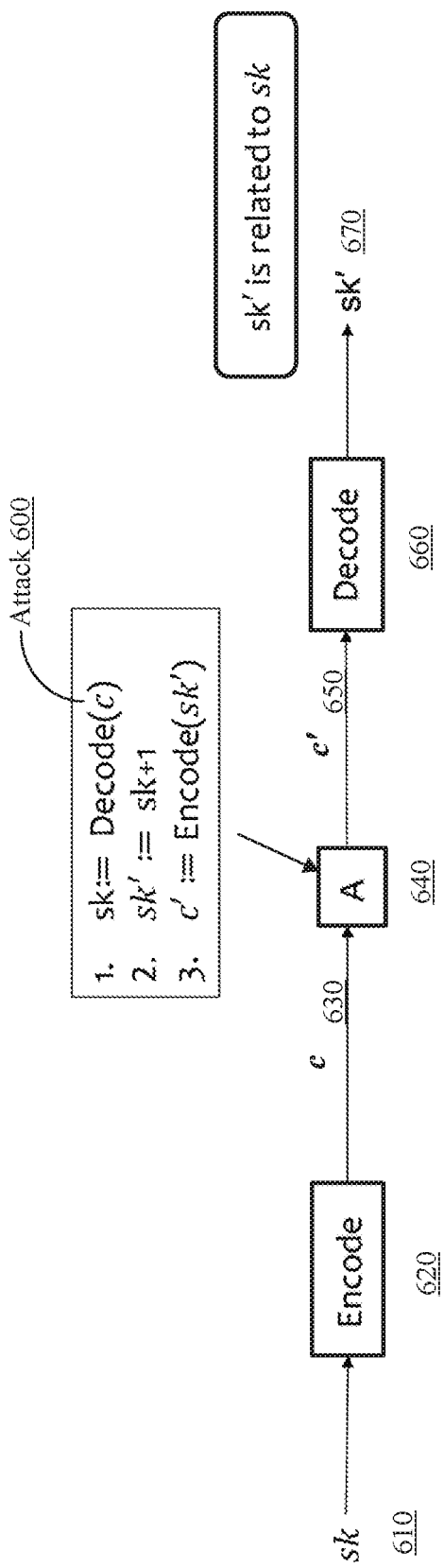
FIG. 6 shows an example of a fault attack on an encoded secret when the tampering attacker is capable of both encoding and decoding.

FIG. 6 shows an example of a fault attack on an encoded secret when the tampering attacker is capable of both encoding and decoding. Certain actions performed in FIG. 6 may be performed in a secure element of a mobile device or other underlying device, e.g., a stationary device. For ease of illustration, the secure element and the mobile device are not shown.

A secret (sk) 610 is encoded by encoding function 620 to provide a code (c) 630. This initial encoding can be performed by a provisioning device, as described herein. The provisioning to the mobile device can result in code 630 being stored in secure memory of a secure element. The provisioning may include installing a decoding function 660, so that the mobile device can use secret 610, e.g., to encrypt messages or perform an authentication procedure.

Once code c is stored, an attacker module 640 can perform an attack 600. Attacker module 640 can be malware that is installed onto the mobile device over a network (e.g., if a user unknowingly selects a link that installs the malware). As another example, a person could steal the mobile device and install attacker module 640.

In attack 600, attacker module 640 can retrieve or intercept code 630 from the secure memory and perform the three listed actions (1)-(3). The interception of code 630 can occur when decoding function 660 attempts to retrieve code 630 and decode it. In action (1), attacker module 640 can decode code (c) 630 to obtain secret (sk) 610. The decoding can be performed using only code of attacker module 640, or also use decoding function 660. In action (2), attacker module 640 alters the secret by adding one to it, thereby obtaining altered secret sk':=sk+1. In this manner, sk' is related to sk, and the knowledge of sk' completely reveals the knowledge of sk due to this relation. In action (3), attacker module 640 encodes the altered secret sk' using encoding function 620 to obtain an altered code (c') 650. As the original encoding is performed by a provisioning device, attacker module 640 would include the encoding function 620.

After performing attack 600, decoding function 660 can receive altered code 650 and decode it to obtain altered secret (sk') 670. Altered secret 670 can then be used in a function (e.g., encryption) that is applied to input, thereby obtaining an output that depends on altered secret 670, e.g., as described for FIG. 4. Thus, any external person or software (i.e., external to the secure element) performing the attack only gets to see $F_{sk}$(input). But, since sk and sk' are related, the external entity can deduce sk. The attacker is aware of A (e.g., which specific bits or row of bits are being flipped), and thus can infer secret 610 by systematically making changes and viewing the outputs of the secure element, e.g., by providing a same input and determining how the output changes for different changes to secret 610. As shown, there is no way to prevent this attack without imposing further restriction.

IV. Space-Bounded Tampering Model

As described above, hackers can tamper with the "secure" memory of devices. Encoded values in a memory cell can be decoded, altered, and re-encoded to deduce the original values. One solution to such attacks is when a hacker is limited by the resource required for encoding. Complexity in this context can be the number of bits needed for an algorithm to run (i.e. maximum memory required at any point in the algorithm). Thus, a limitation would be the amount of memory available to perform the encoding function. Accordingly, the encoding algorithm would require more memory than the attacker is allowed.

Ideally, tampering is resisted by utilizing an encoding procedure that requires a large space (large amount of memory) in conjunction with a decoding process that can be performed in small space (relatively small amount of memory). With such a limited encoding function, the attacker would not be able to re-encode the altered secret. If the attacker cannot re-encode, then the attacker cannot provide an altered code to the decoding function. The encoded value has some format, and an attacker may have some function to decode the message, but the attacker cannot formulate an encoding that adheres to the format, e.g., a format that is verifiable. Thus, no output would be obtained from the secure memory. However, the inability to encode does not prevent the attacker to tamper the encoded state arbitrarily as permitted by the allowed memory. The non-malleable codes should guarantee that such tampering would result in one of the three cases mentioned above, thereby protecting the secret.

FIG. 6 can illustrate the need to re-encode. The operation of $F_{sk}$(input) can be set to only occur using an output of decoding function 660. Thus, the only way to output a value, e.g., output=$F_{sk}$(input), is to first provide a code to decoding function 660. Thus, the attacker could not just use sk' at action (2) for use in the function $F_{sk}$(input). Further, the attacker could decode C to get SK but it cannot re-encode it. Thus, the attacker cannot change SK to SK' and then re-encode to get C'.

The requirement of non-malleability can make the task of allowing decoding and not encoding even more difficult. In particular, the decoding function also may require too much memory and be inefficient considering the memory and processing power of current mobile devices. One solution (https://eprint.iacr.org/2017/530.pdf) requires approximately 30-100 MB of available computation space to verify each 128-bit message (e.g., as part of a decoding procedure), which is not very space-efficient. Furthermore, the requirement grows in the 4th power with the message length (or the security-parameter).

If the amount of memory required to decode is too large for the mobile device to practically use the encoding/decoding scheme, then the solution is unworkable even if the mobile device can be provisioned with the code. For example, assume a provisioning device (e.g., a provisioning server) has terabytes of space for encoding, and thus can encode the secret to obtain a code word and provision the mobile device. Such a requirement of terabytes of memory ensures that the mobile device cannot perform the encoding, but such a restriction is not beneficial if the mobile device does not have enough memory to perform the decoding. Ideally, the decoding should take kilobytes of memory for practical usage.

Figure 7:
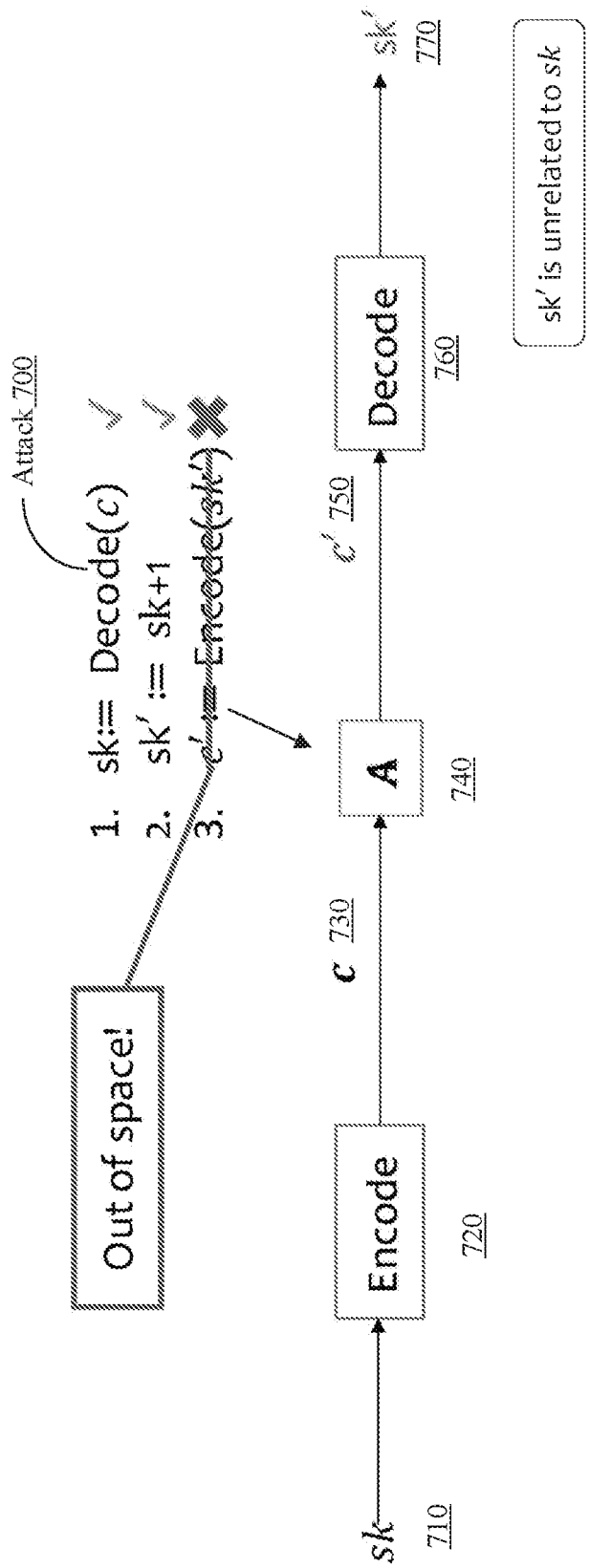
FIG. 7 shows an example of an attacker not able to successfully perform an attack on an encoded secret stored in a device due to limited memory resources on the device according to embodiments of the present invention.

FIG. 7 shows an example of an attacker not able to successfully perform an attack on an encoded secret stored in a device due to limited memory resources on the device according to embodiments of the present invention. Certain actions performed in FIG. 7 may be performed in a secure element of a mobile device or other underlying device, e.g., a stationary device, which may have limited memory. For ease of illustration, the secure element and the mobile device are not shown. FIG. 7 mirrors FIG. 6, but the encoding is not possible.

A secret (sk) 710 is encoded by encoding function 720 to provide a code (c) 730. The provisioning to the mobile device can result in code 730 being stored in secure memory of a secure element. The provisioning may include installing a decoding function 760, so that the mobile device can use secret 710, e.g., to encrypt messages or perform an authentication procedure.

In attack 700, attacker module 740 can retrieve or intercept code 730 from the secure memory, but can only perform actions (1) and (2) and not (3). Thus, attacker module 740 cannot encode the altered secret sk' using encoding function 720 to obtain an altered code (c') 750. Thus, an altered secret 770 that is related to original secret 710 cannot be obtained. At best, altered secret 770 is unrelated to original secret 710, and may just be an error message.

V. Formulation where Decoding Uses Verification

As part of ensuring that encoding cannot be performed using the available resources of a mobile device while allowing the mobile device to perform the coding functionality, embodiments can use a construction related to Proofs of Space (a.k.a. PoS), introduced in [Ateniese et al. Proofs of space: When space is of the essence. In SCN, pages 538-557, 2014; Dziembowski et al., Proofs of space. In CRYPTO, pages 585-605, 2015].

In such an example, a component can use any input to construct a proof that allows verification of the computation without re-computing the entire function (i.e. verifiable computations). For example, if a function is performed on some input to get a particular output, a verification can be performed to confirm that the right function was computed. This verification does not require as much memory as actually generating the particular output. The verification may instead take the proof and verify to confirm the computation of the particular output.

Accordingly, a prover P can prove it has sufficient space available to a space-bounded verifier V. For instance, a proof $p_x$ can be presented for some secret X, e.g., using the Fiat-Shamir transformation [Fiat and Shamir. How to prove yourself: Practical solutions to identification and signature problems. In CRYPTO, pages 186-194, 1986]. The verifier can verify the pair (X; $p_x$) within a bounded space, e.g., using less than s bits. The code word is c=(X; $p_x$). Decoding is done just by running a verification procedure that $p_x$ was generated from X.

The soundness guarantee is that a cheating prover, with overwhelming probability, cannot produce a correct proof unless it uses a large amount of space, i.e., much more than s bits. The correctness guarantee is that the verification will be 1 if $\pi_S$ was indeed generated from X. The requirement of s-bounded verification is that the verification requires at most s-bit memory to execute. If the code word is stored in an s-bounded device, then decoding is possible within the available space whereas encoding is not, as guaranteed by soundness. Accordingly, the only way to generate a valid codeword is to have a provisioning device overwrite the existing codeword.

The above technique can be implemented as:
SETUP→pp: Randomized algorithm that returns a public parameter PP.
$PROVE_{pp}(X) \rightarrow (p_x)$: Deterministic algorithm that receives an input of any challenge (secret) X and returns a proof $p_x$.
$VERIFY_{pp}(X, p_x) \rightarrow 0/1$: Deterministic algorithm that receives an input of a challenge-proof pair and returns a decision bit 0/1 ('0' for $p_x$ not being generated from X, and '1' for $p_x$ being generated from X).

The Setup function and the prove function are performed by a provisioning device. The setup function can be executed once for all proofs while setting up the device. Once the Prove function is performed, the secret X, proof $p_x$, and the public parameter PP can be sent to the mobile device as part of provisioning. The Verify function can be performed by the mobile device as a decoding function. The codeword C can comprise (X, $p_x$, PP) and be stored in a secure element, which includes the Verify function. To perform a function F that uses the secret X to operate on an input (e.g., an encryption operation), the decoding function can parse X, $p_x$, and PP from the codeword C and use the Verify function to determine whether the challenge-proof pair is valid (output=1) or not (output=0). If the challenge-proof pair is valid, the function $F_X$(input) provides an output. If the challenge-proof pair is invalid, the secure element can provide an error message, e.g., ⊥.

In one technique, the Setup function uses a stack of localized expander graphs (SoLEG) to generate the public parameter as a graph, and the Prove function uses the graph to compute a labeling of the graph and commits to the resulting string (proof) using the Merkle commitment scheme. Then a few challenge vertices of the graph are chosen randomly. For each challenged vertex, the prover computes and outputs the opening for this vertex as well as opening for all its predecessors. The verifier gets as input the secret (identity) and the proof, including, a commitment and the openings. The Verify function can verify the consistency of all the openings with respect to the commitment, and check the local correctness of the labeling. SoLEG is an example of a memory-hard function, but its construction in the Prove function results in the decoding using a lot of memory. In contrast, embodiments can apply a memory-hard function before the Prove function, thereby allowing the decoding to be performed using a lower amount of memory.

The labeling of the graph requires a lot of memory (space) per the desired goal of having the encoding require a lot of memory. The Verify function uses less memory as it checks openings of only a few random challenge vertices. However, the above technique can require too much memory for the Verify function to properly function on a mobile device, e.g., requiring 30 Mb or more of memory to be usable by a secure element.

As part of using less memory for the decoding, embodiments can use verification of computation, not verification of large space. PoS guarantees that the prover uses enough space, but it does not guarantee anything about the computation. In particular, if the prover uses a different encoding method than specified, but still uses significant space, then the verification will be valid. Instead, in verification of computation, the prover must use the specified encoding function to make the verification (decoding) be valid. In particular, if the prover uses a different encoding function, the verification will fail even if a large space of computing is used.

VI. Use of Memory-Hard Functions

Embodiments provide encoding/decoding techniques where the decoding function can be performed with less than s bits and the encoding function requires much more than s bits (e.g., 10×, 100×, or 1000×). In particular, embodiments can provide encoding/decoding techniques where the amount of memory for encoding is tens or hundreds of gigabytes (e.g., terabytes) while the decoding requires only a few kilobytes. Thus, embodiments can improve upon techniques described above. Furthermore, such a proposed construction can make the verification memory linear with the message-size (security parameter) and hence scalable To enable the decoding function to be performed with less memory while maintaining the requirement of a large amount of memory for the encoding function, a memory-hard function can be implemented using the secret X as input and provide an output Y, before the Prove function is performed. In one implementation, Y=MHF(Hash(X)) where Hash is any standard hash function e.g. SHA-256, and MHF is any standard memory-hard function.

Given any input, execution of the memory-hard function can require at least a given amount of space. The memory-hard function will require a certain number of bits. An example memory-hard function can be found in en.wikipedia.org/wiki/Scrypt or Biryukov et. al. "Argon2: the memory-hard function for password hashing and other applications," available at password-hashing.net/argon2-specs.pdf. The memory-hard functions can be proven memory hard in the random oracle model, and may implemented techniques used for password hashing.

Given that the memory-hard function has constrained the minimum amount of memory needed, the Prove function may not need to be as complex, thereby resulting in a decoding function that is not as memory intensive. Verifiable computation techniques can be used, e.g., Succinct Non-interactive ARgument of Knowledge (SNARK) techniques In some embodiments, the Prove and Verify function can be implemented using Pinnocchio (eprint.iacr.org/2013/279.pdf), which uses less memory than the example provided in the previous section. Such verifiable computation techniques can verify that a same encoding function is used instead of verifying the amount of space the computation used. Furthermore, the verification procedure can independent of the complexity of the computation. Thus, using a space-intense computation does not alter the space-complexity of the verification.

A. Encoding Method (Provisioning Server)

Figure 8:
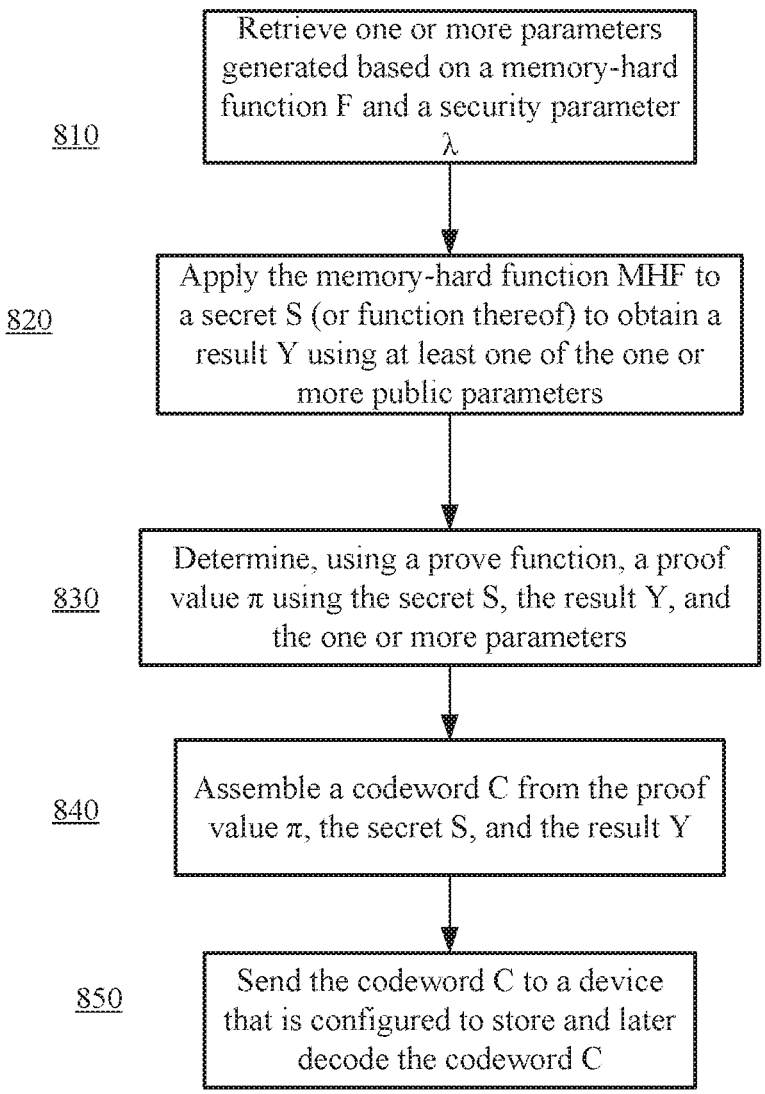
FIG. 8 is a flowchart illustrating a method for encoding a secret according to embodiments of the present invention.

FIG. 8 is a flowchart illustrating a method 800 for encoding a secret according to embodiments of the present invention. Method 800 can be performed on an encoding computer, which may provision a codeword to a mobile device. Method 800 can use memory-hard functions as part of encoding to ensure that a minimum amount of memory is required on an encoding device, and use verifiable computation techniques that allow a limited-memory device to perform the decoding, while still providing a mechanism to identify tampering.

At block 810, one or more public parameters are retrieved, where the one or more public parameters are generated based on a memory-hard function F and a security parameter λ. The generation of the one or more public parameters can be performed by a Setup function, e.g., depicted as VC.SETUP (F)→pp, where pp corresponds to the one or more public parameters. In some implementations, a plurality of public parameters may be generated, including a first parameter and a second parameter that are different parameters. As examples, a public parameter can include an evaluation key (EK_F) which a prover can use later. This evaluation key EK_F may be dependent on F. Another key for verification, VK_F can also depend on F. The computations can depend on the security parameter. A security setting around 128 bits can be used.

At block 820, the memory-hard function MHF is applied to a secret S or to a function of S (e.g., a hash) to obtain a result Y. The application of the memory-hard function F to the secret S can require at least N bytes of memory on the encoding computer. As an example, N can be at least one gigabyte (e.g., 2 GB, 5 GB, 10 GB, 100 GB etc.). In some embodiments, N can be set by tuning the security parameter and other system parameters. In some embodiments, the memory-hard function MHF can be applied to a hash function H (e.g., outputting Z) that is applied to the secret S, such that the memory-hard function (MHF) acts on the output Z of the hash function. The MHF can also include hashing. The hash function H can be such that for any x, H(x) is random. In some implementations, one parameter of the one or more public parameters is used to determine F(S), e.g., evaluation key EK_F, as described below. More than the one parameter may also be used to determine F(S).

At block 830, a prove function determines a proof value π using the secret S, the result Y, and one of the one or more public parameters. The proof value π is verifiable, and thus can be used to verify S and Y (e.g., that they have not been tampered with). The provide function may be depicted as VC.PROVE$_{pp}$(S,F)→π.

At block 840, a codeword C is assembled from the proof value π, the secret S, the result Y, and at least one of the one or more public parameters. The codeword C can be depicted as C:=(S,Y, In some embodiments, a second parameter of the public parameters may be used in block 840, and a different first parameter may be used in block 830. In other embodiments, a same public parameter can be used in both blocks. The proof value π may have constant size. The public parameters can be hardcoded permanently into a device, e.g., as they are same for all codewords and non-tamperable. The public parameters can be outside the device, e.g., stored in a trusted server. The Prove and Verify functions can access the public parameter when needed.

At block 850, the codeword C is sent to a device that is configured to store and later decode the codeword C. The proof value π is configured to be used by a decoding function of the device to verify a correctness of the stored result Y as being obtained from the memory-hard function F using the secret S. The decoding function can be operable to use K bytes of memory. As an example, K may be at least 100, 200, 500, or 1000 times less than N. For example K can be in the hundreds (e.g., 500), or tens or hundreds of thousands (e.g., 10 kB, 50 kB, 100 kB, or 500 kB).

Thus, the decoding function can still be performed by a device that has limited memory, e.g., a mobile device. And, an improvement is the ability to decode (e.g., verify) using a relatively small amount of memory, which makes decodes viable on the mobile device while still keeping the encoding impossible to perform on the mobile device. Further, in embodiments where the decoding is performed in a secure element, it would be difficult to add more memory, e.g., by connecting the mobile device to another device with additional memory and processing power.

In various embodiments, the decoding function can be a verification function or include a verification function, and thus can include other functionality besides verification. The verification may be depicted as VC.VERIFY$_{pp}$(S, Y, π)→0/1. If Y is equal to F(S) then the verify function will output 1; and if it is not equal to F(S), it will output 0. A completeness requirement can ensure that if a proof is correctly generated then it must verify correctly. A soundness requirement can ensure that if y≠F(x), then the proof should not verify correctly. If VC.VERIFY need s bits of memory to execute, then VC.VERIFY can be considered s-bounded.

B. Example Encoding/Decoding Schemes

FIG. 9 shows an example encoding/decoding scheme 900 using a hash function according to embodiments of the present invention. In this example, a function F includes an initial hash function H (which is applies to the secret x) and a memory-hard function (MHF). Such an example corresponds to block The steps 920 and 930 (including sub-steps 931-934) can be performed by a provisioning device, and step 940 can be performed by a verification device, e.g., a user device that may be mobile. Step 940 may be performed in a secure element of the verification device.

At 910, the function F is defined as comprising the memory-hard function (MHF) and a hash function H, with the hash function H being applied first.

At 920, a Setup function determines one or more public parameters PP. The Setup function can use the function F to determine PP. Details of the Setup function can be found in Pinnocchio (eprint.iacr.org/2013/279.pdf).

At 930, a Prove function is used to generate a codeword C, including a proof value, corresponding to a secret X. As shown, the Prove function is implemented as follows. At 931, the hash function H is applied to the secret X to obtain a hash Z. The hash function may be performed using various techniques, such as hash tables, a trivial hash function, perfect hashing, minimal perfect hashing, hashing uniformly distributed data or other distributions, rolling hash, universal hashing, multiplicative hashing, and cryptographic hash functions. The hash function may map the secret H to a fixed-sized hash and may be a one-way hash function. The hash function H may have the properties of: deterministic so the same message always results in the same hash, infeasible to generate a message from its hash value except by trying all possible messages, a small change to a message should change the hash value so extensively that the new hash value appears uncorrelated with the old hash value, and infeasible to find two different messages with the same hash value. The hash function can behave as a random function (popularly known as Random Oracle Model.) and can be instantiated with a cryptographic hash function. An example hashing function is SHA-256.

At 932, the memory-hard function MHF is applied to the hash Z to obtain the result Y. At 933, a VC.Prove function is applied to the secret X and result Y to determine a proof π using at least one public parameter. At 934, a codeword C is assembled to include the secret X, the result Y, the proof π, and the at least one public parameter PP. The codeword C can be sent to a verification device, e.g., a device that uses the secret X for cryptographic purposes.

At 940, the Verify function verifies the codeword C. The codeword C can be parsed to individually determine the secret X, the result Y, the proof π, and the at least one public parameter PP. Then, the Verify function can use the proof π to confirm that the result Y was determined by applying the function F to the secret X. If X, Y, proof π, or the at least one public parameter PP are altered, then the verification will be false.

In some embodiments, when the verification is true, a cryptographic function can be applied to the input data using the secret S to obtain output data that is output from a secure element of the verification device. When the correctness is false, an error message may be provided. Accordingly, the result of the verification can dictate further functionality of the verification device, e.g., whether a secure element of a mobile device is to encrypt input data using the secret X.

Figure 10:
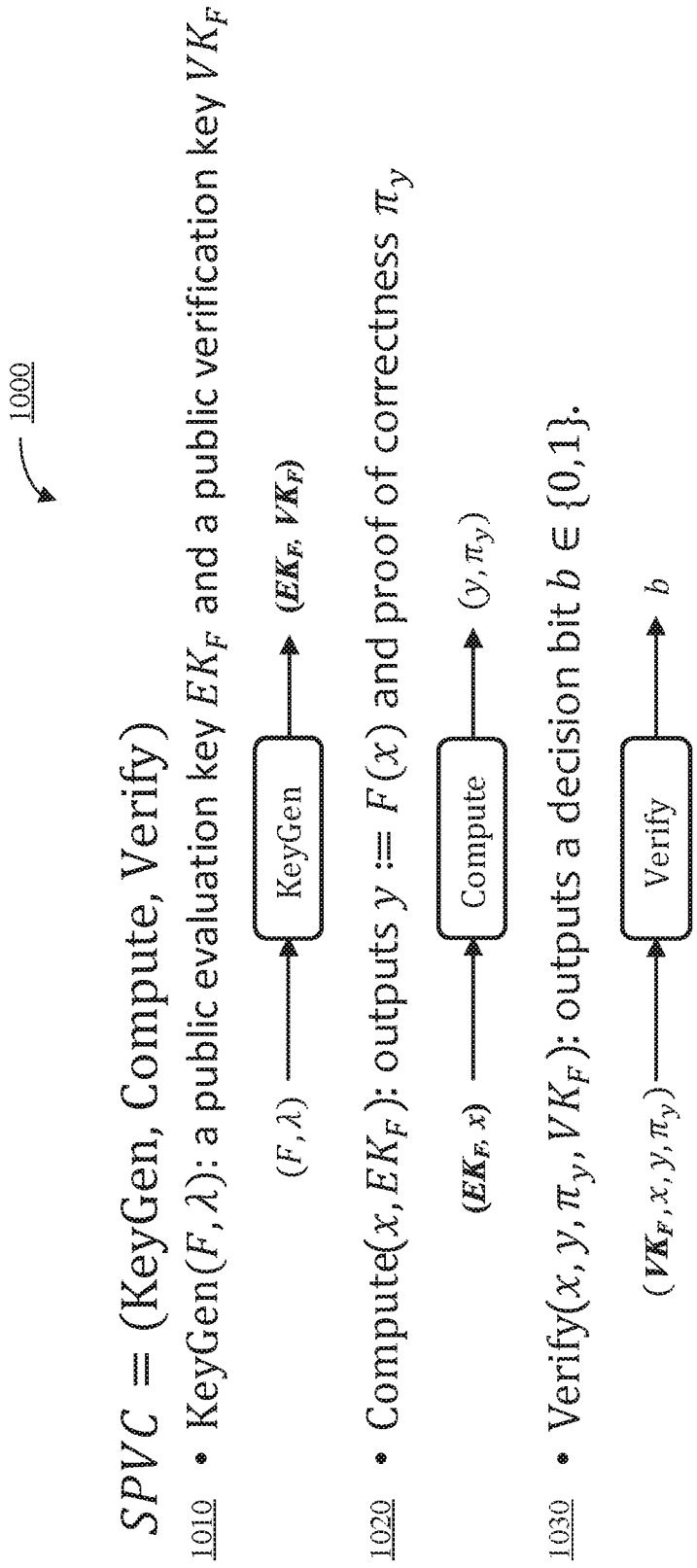
FIG. 10 shows an example encoding/decoding scheme 1000 using publicly verifiable computation according to embodiments of the present invention.

FIG. 10 shows an example encoding/decoding scheme 1000 using publicly verifiable computation according to embodiments of the present invention. Scheme 1000 uses two public parameters a public evaluation key $EK_F$ and a public verification key $VK_F$. The key generation (KeyGen) is performed as the Setup Function. The Compute function performs the encoding. And, the Verify function is the decoding. FIG. 11 show a depiction of the encoding/decoding scheme from FIG. 10.

At 1010, the key generation uses a security parameter λ and the function F. In some implementations, the function F may include multiple parts, e.g., an initial hashing function and a memory-hard function applied to the hashing result, as in FIG. 9. The public evaluation key $EK_F$ and the public verification key $VK_F$ are generated using the security parameter λ, and the function F. Such key generation may be performed as in Pinnocchio. Setup function 1110 of FIG. 11 corresponds to the key generation in 1010.

At 1020, the secret X and public evaluation key $EK_F$ are used as input. The function F uses the secret X to determine a result Y. Then, a Prove function can use the secret X and the result Y to obtain the proof $\pi_y$ of correctness. Steps 1010 and 1020 can be performed by a provisioning device that has enough memory to perform the encoding. The provisioning device can send a codeword, comprising X, Y, $\pi_y$, and $VK_F$, to a user device that can use the secret X for cryptographic purposes.

The encoding function 1120 of FIG. 11 corresponds to the Compute function of 1020. F is computed using the secret X and public evaluation key $EK_F$ to obtain the result Y and the proof $\pi_y$. The code C is then assembled using the secret X, the result Y, and the proof $\pi_y$.

At 1030, a Verify function can used the codeword to confirm whether the result Y was indeed generated from the secret X using $\pi_y$ and $VK_F$. The decoding function 1130 corresponds to 1030. The decoding can be performed by the provisioned device, e.g., a phone. The codeword can be parsed to obtain the secret X, the result Y, and the proof $\pi_y$. Then, a verify function can use the public verification key $VK_F$ and the proof $\pi_y$ to verify that the application of the function F to the secret X is indeed Y.

VII. Devices

The provisioning device and mobile device are now described.

A. Provisioning Device

Figure 12:
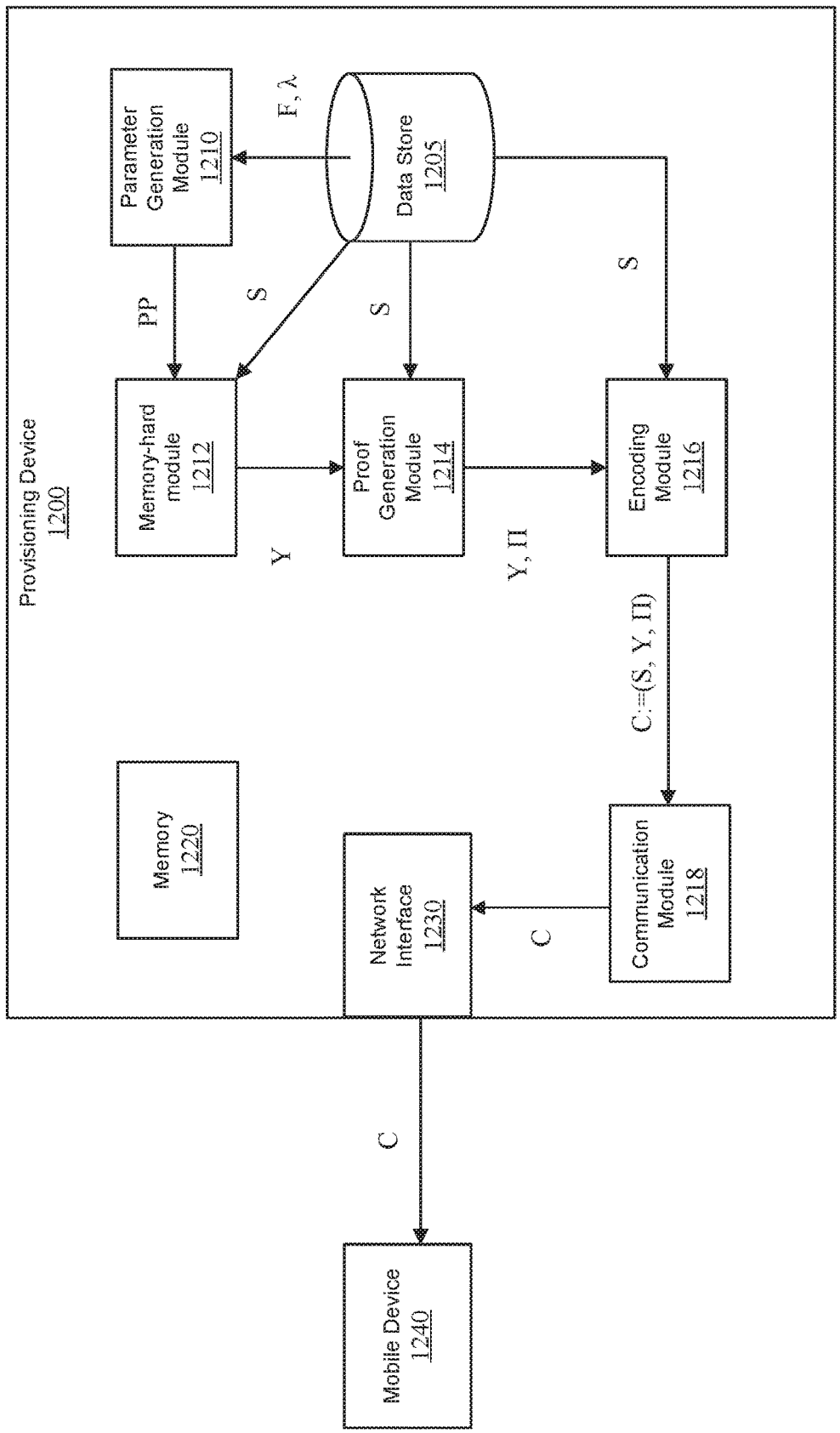
FIG. 12 shows a block diagram of a provisioning device according to embodiments.

FIG. 12 shows a block diagram of a provisioning device 1200 according to embodiments. Modules of provisioning device 1200 can be implemented in hardware or software, e.g., stored in a computer readable medium and executed by a processor.

Provisioning device 1200 includes a data store 1205, a parameter generation module 1210, a memory-hard module 1212, a proof generation module 1214, an encoding module 1216, a communication module 1218, and a network interface 1230. Provisioning device 1200 may implement method 800, including schemes described in FIGS. 8-11.

Data store 1205 can store a secret S to be encoded and a security parameter λ. The data store may be implemented in various ways, e.g., in a cache of a processor, RAM, flash memory, or a hard drive.

Parameter generation module 1210 can receive the security parameter λ and information about the function F, which includes a memory-hard function MHF) to be used (e.g., an identifier indicating which memory-hard function is used or some parameters of F). Parameter generation module 1210 can generate one or more public parameters PP based on the memory-hard function F and the security parameter λ. Other modules can also use the security parameter λ. In some embodiments, aspects of the function F can be hardcoded to parameter generation module 1210, and thus no information may need to be sent from data 1205. The one or more public parameters PP may include key(s), e.g., the keys of FIGS. 10 and 11. Thus, parameter generation module 1210 may be a key generation module for verifiable computation. Once the one or more public parameters Previously Presented are generated, they can be stored for access by other modules, as well as other devices, e.g., for public access.

Memory-hard module 1212 can implement a memory-hard function F that requires memory 1220 to be of sufficient size. Data store 1205 can be part of memory 1220, and thus can be a same memory structure. Memory-hard module 1212 can receive the one or more public parameters PP and secret S and provide a result Y, which can be used to generate a proof. Memory-hard module can include other functions than the memory-hard function F, e.g., an initial hashing function, as described herein.

Proof generation module 1214 can receive the secret S and the result Y, where Y results from operation of memory-hard module on secret S. Proof generation module 1214 provides a proof π that can be used to efficiently verify that Y is indeed the result from applying the memory-hard function F to secret S. A corresponding decoding function can use perform such a verification.

Encoding module 1216 can receive the proof π, and result Y, and the secret S for forming a code C. The code C can be provided to communications module 1218 that may put the code C into a message (e.g., an encrypted message) that is sent to mobile device 1240 by network interface 1230. Communications module 1218 can use any suitable network protocols, e.g., TCP/IP or Ethernet, as may occur for a wired connection. Once provisioned, mobile device 1240 can store code C in a secure element and decode C to implement cryptographic functionality. The decoding function that uses the proof π can be sufficiently succinct such that the decoding can be performed on a mobile device, e.g., in a secure element that may only have 1 kB, 50 kB, 100 kB, 500 kB, or 1 MB of memory.

B. Mobile Device

Figure 13:
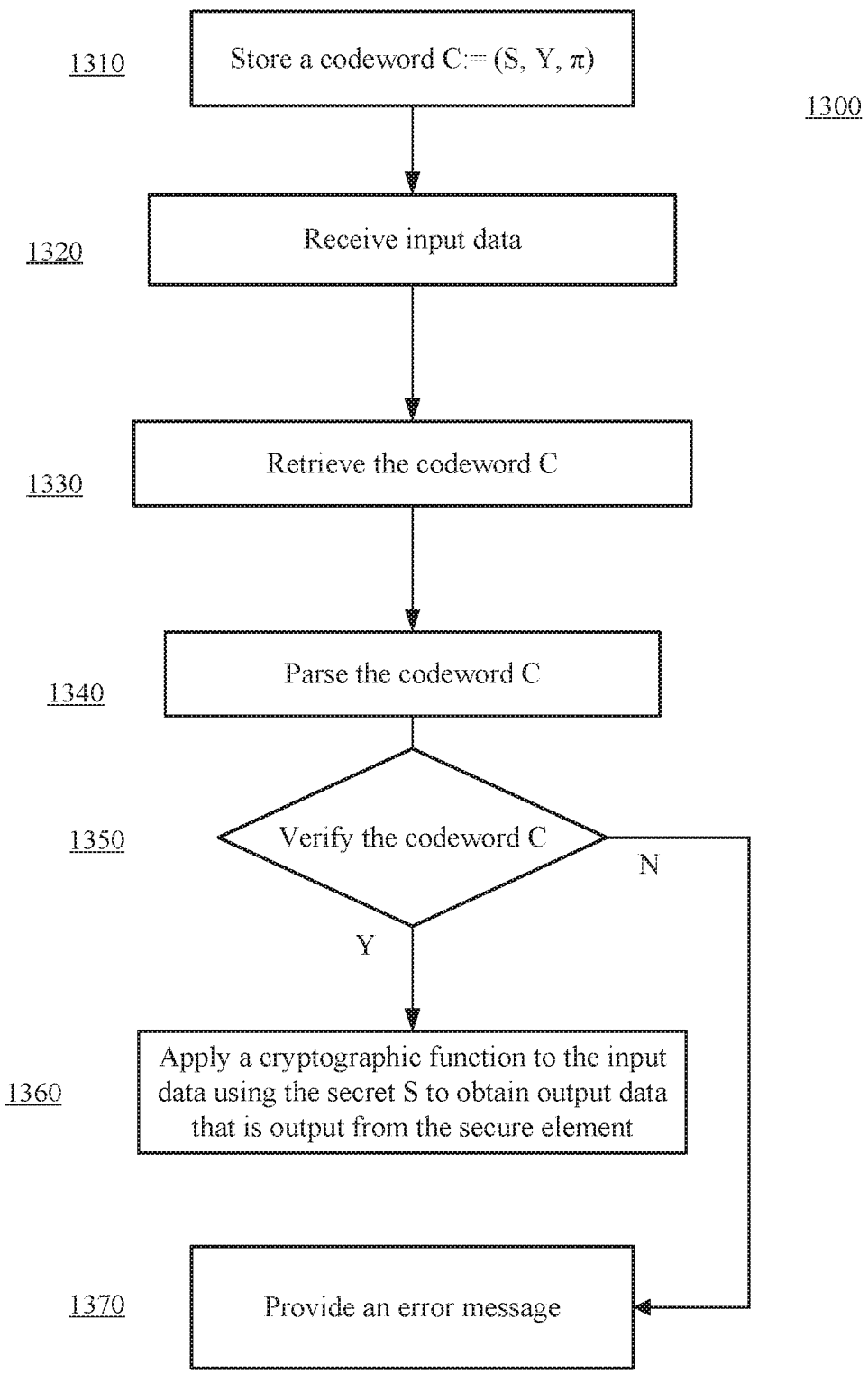
FIG. 13 shows a method 1300 illustrating a decoding process using a codeword for use in a cryptographic function according to embodiments of the present invention.

FIG. 13 shows a method 1300 illustrating a decoding process using a codeword for use in a cryptographic function according to embodiments of the present invention. Method 1300 may be performed by a mobile device or other verification device, particularly a device that is memory-limited. For instance, a secure element of the device may be memory limited.

At block 1310, a secure memory stores a codeword C. Codeword C can comprise a proof value $\pi$, a secret S, and a result Y obtained by applying a memory-hard function F to the secret S. The application of the memory-hard function MHF to the secret S or a function of the secret S can require at least N bytes of memory. N may be at least one gigabyte.

At block 1320, input data can be received, e.g., at a secure element. The secure memory may be part of the secure element. The secure element may perform method 1300. As an example, the input data can include a message that is to be encrypted before sending to a recipient.

At block 1330, the codeword C is retrieved from the secure memory.

At block 1340, the codeword C is parsed to identify the proof value $\pi$, the secret S, and the result Y. Additional, one or more public parameters used by a memory-hard function MHF to obtain the result Y may be retrieved.

At block 1350, the codeword C is decoded by using the proof value $\pi$ to verify a correctness of the stored result Y as being obtained by applying the memory-hard function F on the secret S. The decoding can be operable to use K bytes of memory. K may be at least 100 times less than N.

At block 1360, when the correctness is true, a cryptographic function can be applied to the input data using the secret S to obtain output data that is output from the secure element.

At block 1370, when the correctness is false, an error message can be provided, e.g., a value of $\bot$ may be output.

Figure 14:
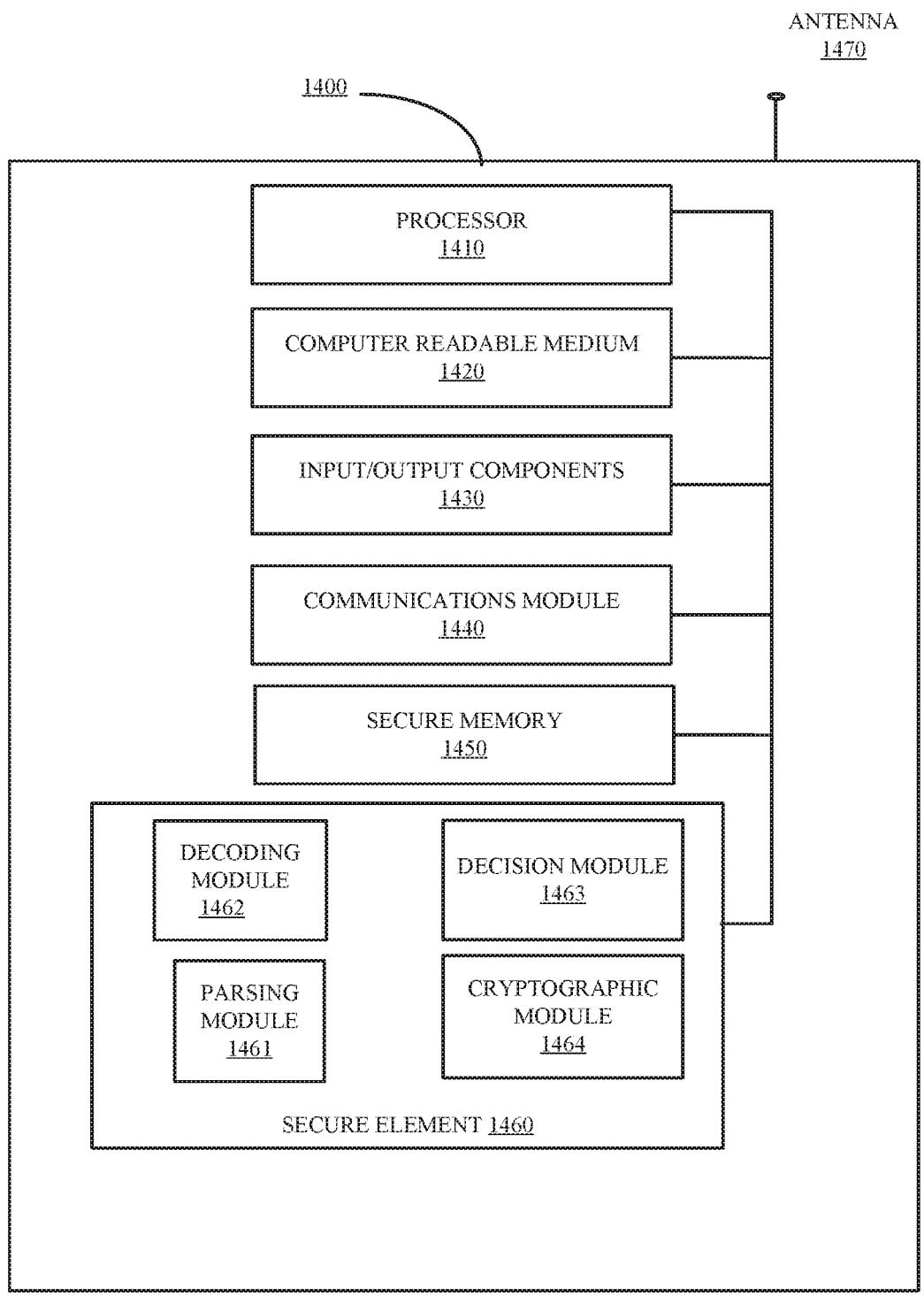
FIG. 14 shows a block diagram of a mobile device according to embodiments.

FIG. 14 shows a block diagram of a mobile device 1400 according to embodiments. Mobile device 1400 can send a request for an encoded secret, e.g., as code C. A provisioning computer can send a response with code C to mobile device 1400, which can store code C in secure memory 1450. Mobile device 1400 is an example of a decoding computer.

Mobile device 1400 includes a processor 1410, a computer readable medium 1420 (e.g., for storing software to execute on processor 1410), input/output components 1430 (e.g., a touchscreen, microphone, and speakers), a communications module 1440, a secure memory 1450, and a secure element 1460, each of which may be connected to a communications bus for communicating to each other. In some implementations, secure element 1460 may include secure memory 1450.

Communications module 1440 can receive a codeword C via antenna 1470. Secure memory 1450 can store the codeword C comprising a proof value $\pi$, a secret S, a result Y obtained by applying a memory-hard function F to the secret S, and one or more public parameters used by a memory-hard function F to obtain the result Y. The memory-hard function F may be implemented by a provisioning computer, where the application of the memory-hard function F to the secret S can require at least N bytes of memory. As an example, N may be at least one gigabyte.

As shown, secure element 1460 includes a parsing module 1461, a decoding module 1462, a decision module 1463, and a cryptographic module 1464. Secure element 1460 can receive input data on which to perform a cryptographic function. Parsing module 1461 can retrieve the codeword C from secure memory 1450, and parse the codeword C to identify the proof value $\pi$, the secret S, the result Y, and one or more public parameters.

Decoding module 1462 can decode the codeword C by using the proof value $\pi$ to verify a correctness of the stored result Y as being obtained by applying the memory-hard function F on the secret S. Decoding module 1462 can be operable to use K bytes of memory. As an example, K may be at least 100 times less than N. Decoding module 1462 can output whether the correctness is verified (true) or not (false).

Decision module 1463 can use the output from decoding module 1462 to determine whether to output an error message or to engage cryptographic module 1464. When the correctness is true, cryptographic module 1464 can be applied to the input data using the secret S to obtain output data that is output from the secure element. When the correctness is false, an error message can be output from secure element 1460.

VIII. Example Computer System

Figure 15:
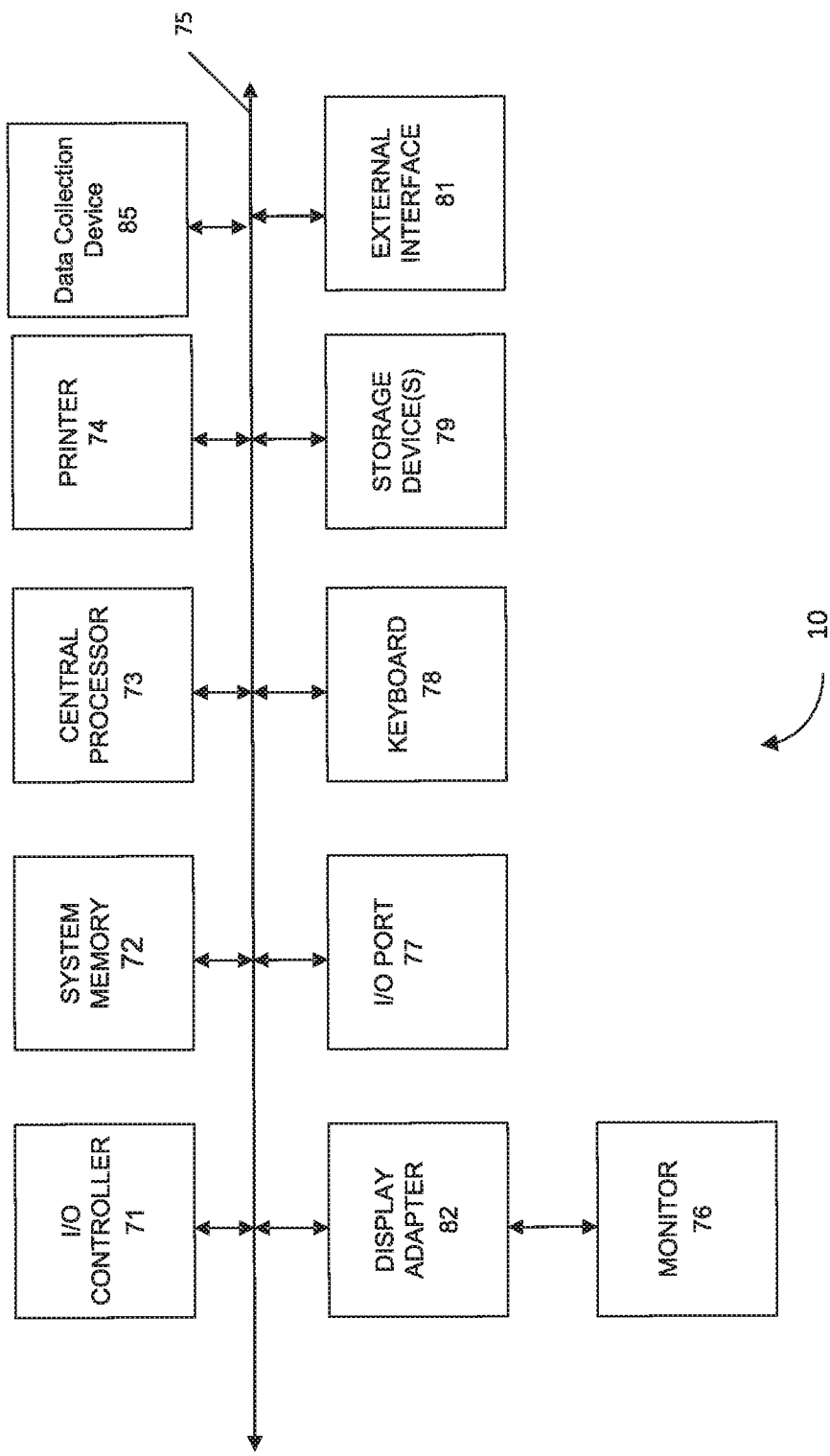
FIG. 15 shows a block diagram of an example computer system usable with systems and methods according to embodiments of the present invention.

Any of the computer systems mentioned herein may utilize any suitable number of subsystems. Examples of such subsystems are shown in FIG. 15 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 15 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

What is claimed is:

1. A method for encoding a secret, the method comprising performing on an encoding computer:
   retrieving one or more public parameters generated based on a memory-hard function MHF and a security parameter $\lambda$;
   applying the memory-hard function MHF to a secret S or to a function of the secret S to obtain a result Y, wherein the applying of the memory-hard function MHF to the secret S requires at least N bytes of memory on the encoding computer, N being at least one gigabyte;
   determining, using a prove function, a proof value $\pi$ using the secret S, the result Y, and the one or more public parameters;
   assembling a codeword C from the proof value $\pi$, the secret S, and the result Y; and
   sending the codeword C to a device that is configured to store and later decode the codeword C, wherein the proof value $\pi$ is configured to be used by a decoding function of the device to verify a correctness of the result Y as being obtained from the memory-hard function MHF using the secret S, wherein the decoding function is operable to use K bytes of memory, K being less than N.

2. The method of claim 1, wherein K is at least 100 times less than N.

3. The method of claim 1, wherein the one or more public parameters include a public evaluation key.

4. The method of claim 3, wherein the public evaluation key is used to generate the proof value $\pi$ and the result Y.

5. The method of claim 1, wherein the memory-hard function MHF includes a hash function.

6. The method of claim 1, wherein the memory-hard function MHF is applied to the function of the secret S, and wherein the function of the secret S is a hash function.

7. The method of claim 1, wherein N is at least one terabyte.

8. The method of claim 1, wherein the decoding function requires less than 1 MB of memory.

9. A method for decoding a secret, the method comprising performing on a decoding computer:
   storing a codeword C comprising a proof value $\pi$, a secret S, and a result Y obtained by applying a memory-hard function MHF to the secret S or to a function of the secret S, wherein the applying of the memory-hard function MHF to the secret S requires at least N bytes of memory, N being at least one gigabyte;
   receiving input data;
   retrieving the codeword C;

parsing the codeword C to identify the proof value π, the secret S, the result Y, and one or more public parameters used by the memory-hard function MHF to obtain the result Y;

performing a decoding of the codeword C by:
  using the proof value π to verify a correctness of the result Y as being obtained by applying the memory-hard function MHF on the secret S, wherein the decoding is operable to use K bytes of memory, K being less than N;

when the correctness is true, applying a cryptographic function to the input data using the secret S to obtain output data; and when the correctness is false, providing an error message.

10. The method of claim 9, wherein K is at least 100 times less than N.

11. The method of claim 9, wherein the one or more public parameters include a public verification key.

12. The method of claim 11, wherein the public verification key is used by the decoding.

13. The method of claim 9, wherein the decoding requires less than 1 MB of memory.

14. The method of claim 9, further comprising:
receiving the codeword C from a provisioning computer than generated the proof value π and the result Y by applying the memory-hard function MHF to the secret S.

15. The method of claim 9, wherein the codeword C is stored in secure memory, and wherein a secure element performs the decoding of the codeword C and the applying of the cryptographic function.

16. A device comprising:
  a secure memory storing a codeword C comprising a proof value π, a secret S, and a result Y obtained by applying a memory-hard function MHF to the secret S or to a function of the secret S, wherein the applying of the memory-hard function MHF to the secret S requires at least N bytes of memory, N being at least one gigabyte; and a secure element configured to:
    receive input data;
    retrieve the codeword C;
    parse the codeword C to identify the proof value π, the secret S, the result Y, and one or more public parameters used by the memory-hard function MHF to obtain the result Y;
    perform a decoding of the codeword C by:
      using the proof value π to verify a correctness of the result Y as being obtained by applying the memory-hard function MHF on the secret S, wherein the decoding is operable to use K bytes of memory, K being less than N;
    when the correctness is true, applying a cryptographic function to the input data using the secret S to obtain output data that is output from the secure element; and
    when the correctness is false, provide an error message.

17. The device of claim 16, wherein the secure element includes the secure memory.

18. The device of claim 16, wherein K is at least 100 times less than N.

19. The device of claim 16, wherein the one or more public parameters include a public verification key, wherein the public verification key is used by the decoding.

20. The device of claim 16, wherein the decoding requires less than 1 MB of memory.

* * * * *